July 8, 1924.  1,500,875

P. JOLIN

CHAIN FASTENER

Filed July 10, 1922    2 Sheets-Sheet 1

Pacific Jolin,
INVENTOR

BY Victor J. Evans
ATTORNEY

WITNESS:

July 8, 1924.　　　　　　　　　　　　　　1,500,875
　　　　　　　　　　P. JOLIN
　　　　　　　　　CHAIN FASTENER
　　　　　　　Filed July 10, 1922　　2 Sheets-Sheet 2
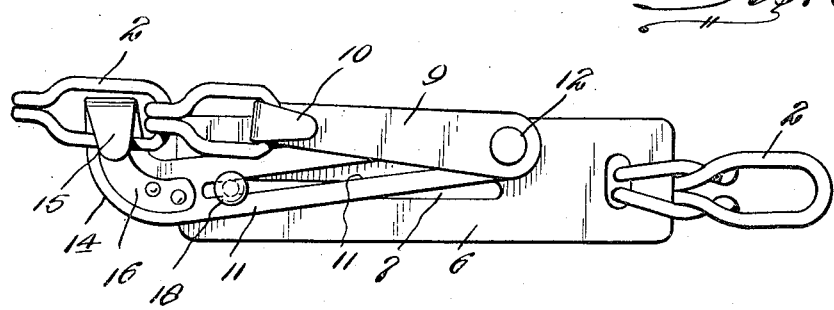
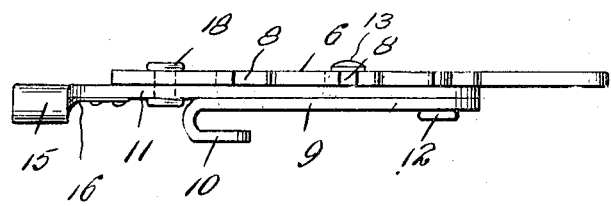
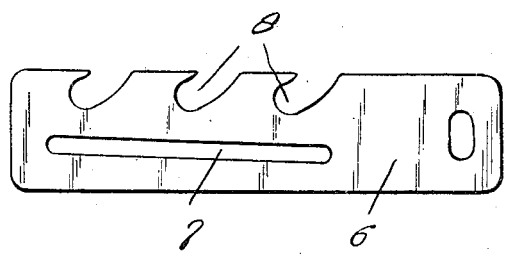
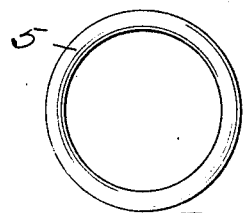
Pacific Jolin,
INVENTOR Patented July 8, 1924.

UNITED STATES PATENT OFFICE.

PACIFIC JOLIN, OF LE BRET, SASKATCHEWAN, CANADA.

CHAIN FASTENER.

Application filed July 10, 1922. Serial No. 573,849.

*To all whom it may concern:*

Be it known that I, PACIFIC JOLIN, a subject of the King of Great Britain, residing at Le Bret, in the Province of Saskatchewan and Dominion of Canada, have invented new and useful Improvements in Chain Fasteners, of which the following is a specification.

My present invention has reference to an anti-skid chain for pneumatic tired wheels.

The object of the invention is to produce a chain for this purpose which will hold the wheel against skidding in any direction and which is provided with novel meals for adjustably securing the end links thereof on a tire.

A further object is to produce a fastening means for the end links of anti-skid chains that shall be of a simple, cheaply manufactured, but effective construction whereby the end links of an anti-skid chain may be adjustably connected.

The foregoing, and other objects which will present themselves as the nature of the invention is better understood, may be accomplished by a construction, combination and operative association of parts such as is disclosed by the drawings which accompany and which form part of this application.

In the drawings:—

Figure 3 is a greatly enlarged view illustrating the manner in which the end links of the chain are adjustably connected.

Figure 4 is a view showing the first step in connecting the chain ends.

Figure 5 is a plan view of the notched and slotted plate.

Figure 6 is a similar view of a ring to which the angle cross chains are attached.

Figure 1:
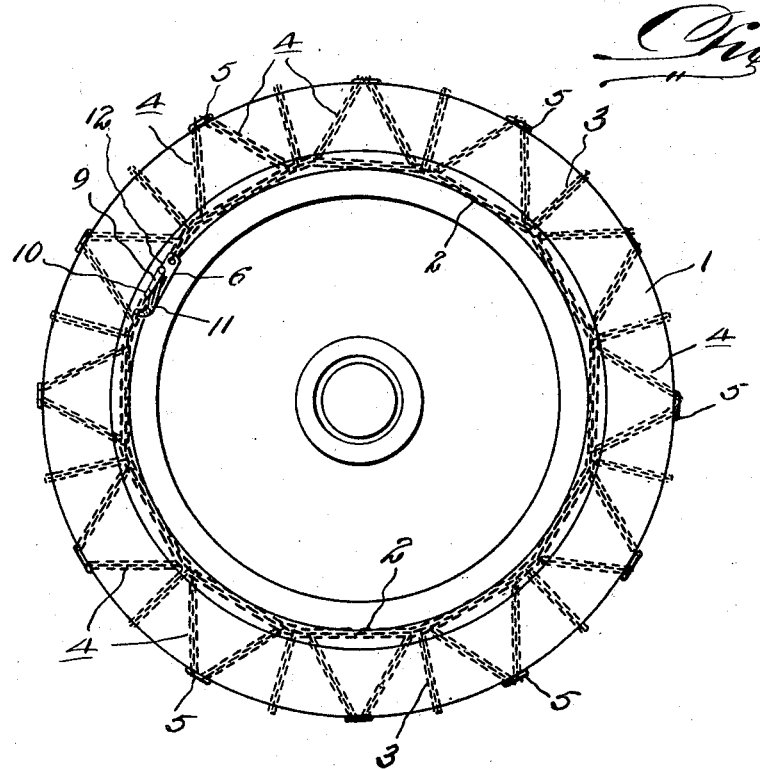
Figure 1 is a side elevation illustrating the application of the improvement.
Figure 2:
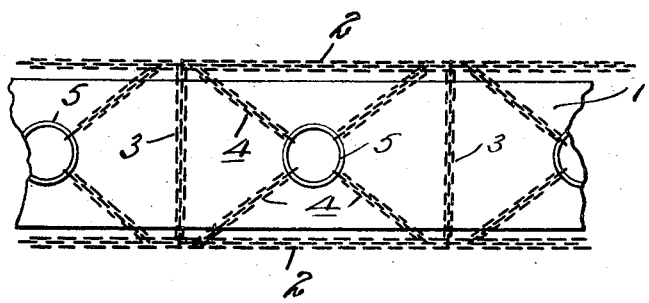
Figure 2 is an edge view thereof.

Referring now to the drawings in detail, a pneumatic tired wheel is indicated by the numeral 1. Around the tire of this wheel there is arranged an anti-skid chain, which includes side chains 2, cross chains 3 and angle chains also connected to the side chains between the cross chains. Two short angle chains 4 respectively are connected to each of the side chains between the cross chains 3, and the angle chains have their ends secured to ring members 5 that are arranged centrally on the tread of the tire of the wheel.

The side chains have their ends adjustably connected in a novel manner as will now be described. To one of the end links of each side chain 2 there is connected a plate 6. The plate is provided with a longitudinally arranged elongated slot 7 therethrough and has one of its edges provided with any desired number of spaced notches 8. The inner walls of the notches are rounded and the side walls thereof are arranged at an angle.

The numeral 9 designates a metal strap having one of its ends hooked, as at 10.

The numeral 11 designates a metal strap or plate which I shall refer to as a lever. The lever 11 is provided with a longitudinally extending slot 11' and is pivotally connected as at 12 to the end of the hook carrying strap 9. The lever 11, inward of its pivotal connection with the hook carrying strap 9 has arranged on its face opposite that to which the strap is connected a headed stud 13.

The lever 11 on the end thereof opposite that pivotally connected with the hook carrying strap 9 is formed with a round extension 14 bent upon itself to provide a hook 15. The beak of the hook 15 is engaged by the free end of a flat spring 16, the other end of the said spring being secured to one side of the lever.

Passing through the elongated slots 7 in the plate 6 and 11' in the lever 11, there is a rolling pivot 18, the opposite ends of the pivot being headed.

As stated, one of the end links of the side chain 2 is connected to the plate 6. In connecting the opposite end link of the said side chain the lever 11 is swung to bring its headed stud 13 in one of the notches 8 of the plate 6. The lever is thus arranged at an angle with respect to the plate 6 and may be further swung to project the hook carrying strap 9 to permit of the hook 10 thereof being received in the referred to second end link of the chain. The lever is then swung in an opposite direction on its sliding pivot 18 to arrange the hook 15 on the end of the lever to a position to engage in a link next to that engaged by the hook 10. The spring 16 snaps against the beak of the hook 15 holding the link in the said hook, and in this manner the anti-skid chain has its ends easily and effectively fastened.

It is thought that the foregoing description, when taken in connection with the drawings will fully set forth the construction and advantages of the improvement to those skilled in the art to which this invention relates.

Having described the invention, I claim:—

1. The combination with an anti-skid chain, of means for connecting the end links thereof, comprising a notched plate to which one of the end links is connected, a lever pivotally and slidably associated with the plate having a hooked end, and having a headed stud adjacent to its oppsite end, a hook carrying strap pivotally secured to the last mentioned end of the lever, and the headed stud of the lever adapted to be received in one of the notches of the plate to allow the hook carrying strap to have its hooked end projected beyond one end of the plate to engage the second end link of the chain, and thereafter said lever designed to be moved on its rolling pivot to bring its hooked end to engage with a link of the chain adjacent that engaged by the hook of the strap.

2. The combination with an anti-skid chain, of means for adjustably connecting the end links thereof, comprising a slotted plate having a notched edge and to which one of the end links of the chain is connected, a slotted lever arranged next to the plate, a slidable pintle passing through the slots in the lever and plate, said lever having its outer end provided with a hook to engage a link of the chain, and having a headed stud adjacent to its opposite end, a strap member having a hooked end pivotally connected to the lever, and the hooked end of the said strap designed to engage another link of the chain, and the headed stud of the lever adapted to be received in one of the notches of the plate to permit of the swinging of the lever of the plate to arrange the hook of the strap in chain link receiving position, and thereafter to be further moved on its sliding pivot to bring the hooked end of the said lever to engage a link of the chain outward of that engaged by the hook of the strap.

3. The combination with an anti-skid chain, of means for adjustably connecting the end links thereof, comprising a slotted plate having a notched edge and to which one of the end links of the chain is connected, a slotted lever arranged next to the plate, a slidable pintle passing through the slots in the lever and plate, said lever having its outer end hooked and provided on one of its faces adjacent to its opposite end with a headed stud, a spring on the lever for contacting the beak of the hook thereof, a strap having a hooked outer end pivotally secured to the lever outward of the headed stud thereon, and to the face thereof opposite that provided with the stud, said lever designed to be moved on its sliding pintle to bring the headed stud thereof into one of the notches of the plate and to be further swung to project the hooked end of the strap toward one end of the plate for the engagement of the second end link of the chain, and thereafter further swung on its sliding pivot in an opposite direction to move the strap inwardly of the plate and to bring the hooked end of the lever to a position to engage another link of the said chain, and the main spring designed to lock the said link in the hook of the lever.

In testimony whereof I affix my signature.

PACIFIC JOLIN.